(12) United States Patent
Ahsan

(10) Patent No.: US 7,163,973 B2
(45) Date of Patent: Jan. 16, 2007

(54) COMPOSITION OF BULK FILLER AND EPOXY-CLAY NANOCOMPOSITE

(75) Inventor: Tanweer Ahsan, Olean, NY (US)

(73) Assignee: Henkel Corporation, Rocky Hill, CT (US)

( * ) Notice: Subject to any disclaimer, the term of this patent is extended or adjusted under 35 U.S.C. 154(b) by 357 days.

(21) Appl. No.: 10/478,792

(22) PCT Filed: Aug. 8, 2002

(86) PCT No.: PCT/US02/25208

§ 371 (c)(1),
(2), (4) Date: Nov. 25, 2003

(87) PCT Pub. No.: WO03/016394

PCT Pub. Date: Feb. 27, 2003

(65) Prior Publication Data

US 2004/0152803 A1 Aug. 5, 2004

(51) Int. Cl.
*C08K 3/18* (2006.01)
*C08K 3/22* (2006.01)
*C08K 7/14* (2006.01)
*H01L 23/29* (2006.01)

(52) U.S. Cl. .................. 523/457; 257/789; 257/793; 523/466

(58) Field of Classification Search ............. None
See application file for complete search history.

(56) References Cited

U.S. PATENT DOCUMENTS

| 4,042,550 A | 8/1977 | Tuller et al. |
| 4,282,136 A | 8/1981 | Hunt et al. ................. 525/481 |
| 4,710,796 A | 12/1987 | Ikeya et al. .................. 357/72 |
| 5,041,254 A | 8/1991 | Gallo .................... 264/272.17 |
| 5,420,178 A | 5/1995 | Gallo .......................... 523/455 |
| 5,476,716 A | 12/1995 | Gallo .......................... 428/413 |
| 5,554,670 A | 9/1996 | Giannelis et al. ........... 523/209 |
| 5,853,886 A | 12/1998 | Pinnavaia et al. .......... 428/403 |
| 6,190,786 B1 | 2/2001 | Hirano et al. ............... 428/620 |
| 6,251,980 B1 | 6/2001 | Lan et al. .................... 524/445 |
| 6,384,121 B1 | 5/2002 | Barbee et al. .............. 524/445 |

FOREIGN PATENT DOCUMENTS

WO     WO 01/04193 A1     1/2001

OTHER PUBLICATIONS

Miller, Bernie, "Nano Clay Particles Create New Compounds", Plastics Formulating & Compounding, pp. 30-32, 1997.
Lan et al., "Clay-Reinforced Epoxy Nanocomposites", Chem. Mater. 1994, 6, 2216-2219.
Lan et al., "Mechanism of Clay Tactoid Exfoliation in Epoxy-Clay Nanocomposites", Chem. Mater. 1995, 7, 2144-2150.
Smock, Doug, "Nanocomposites Showing Promise in Automotive and Packaging Roles", Modern Plastics, Feb. 1998, pp. 26-27.
Sherman, Lilli Manolis, "Nanocomposites A Little Goes A Long Way", Jun. 1999, www.plasticstechnology.com, pp. 52-56.
Lan, Tie, "An Emerging Family of Nanomer® Nanoclays for Thermosets", Nancor-Technical Papers, pp. 1-4, Jan. 2000.
Kang et al., "Nanocomposites from Epoxy Resin and Layered Minerals", Database Caplus on STN, AN 2000:629432, Polymer (Korea), vol. 24, No. 4, 2000, pp. 571-577.
Gilman et al., "Flammability Properties of Polymer-Layered-Silicate Nanocomposites, Polypropylene and Polystyrene Nanocomposites", Chem. Mater. 2000, 12, 1866-1873.

*Primary Examiner*—Robert Sellers
(74) *Attorney, Agent, or Firm*—Steven C. Bauman

(57) ABSTRACT

A molding composition or encapsulant for an electronic component and its method of preparation provides reduced moisture uptake without undue swelling and comprises melt-blending an epoxy resin, hardener and clay, cooling, adding a catalyst to form an epoxy-clay nano-composite, and combining it with a bulk amount of a filler.

20 Claims, No Drawings

COMPOSITION OF BULK FILLER AND EPOXY-CLAY NANOCOMPOSITE

BACKGROUND OF THE INVENTION

1. Field of the Invention

The present invention relates to epoxy molding compositions. More particularly, the present invention relates to epoxy molding compositions having reduced moisture uptake, and which are particularly useful as encapsulants for electronic packaging materials.

2. Brief Description of Related Technology

Epoxy resin compositions are widely used for electronic packaging materials in the electronics industry, and, in particular, as encapsulants for semiconductor elements and electronic circuits. Compositions used as electronic packaging materials must have high reliability including excellent thermal cycle resistance due to extensive temperature changes encountered through typical use of electronic devices. Accordingly, epoxy resin based compositions, and, in particular, cresol novolac-type epoxy compositions, have been widely used in the formation of molding compositions for use as electronic packaging materials.

Assembly of electronic components typically involves exposure of the electronic component to high temperatures to achieve solder reflow for establishing electrical interconnection between a chip and a substrate, as well as to achieve proper curing of any polymeric material which may be used as an underfill material between the chip and the substrate or as an adhesive for adhering the chip to the substrate. During such processing, any moisture present within an encapsulant molding composition can result in steam build-up from such high-temperature exposure. It is believed that excessive amounts of steam build-up during such processing may result in delamination of the encapsulant electronic packaging material. As such, it is important to provide the epoxy molding compositions with a low moisture uptake, to prevent absorption of moisture by the molding composition and, thereby prevent steam build-up and delamination during processing.

To provide low moisture absorption, molding compositions are typically provided with a low viscosity epoxy resin including a bulk amount of a filler material at a high concentration, such as silica. For example, U.S. Pat. No. 5,476,716 discloses various fillers such as silica for use in epoxy molding compositions. This patent also suggests the use of clay as a filler material. The use of clay as a traditional dry-mixed bulk filler material, however, does not provide effective results with respect to moisture uptake.

U.S. Pat. No. 6,190,786 also discloses the use of various inorganic filler materials such as silica and clay as bulk fillers in highly filled molding compositions, noting that such compositions are prone to absorbing moisture in storage. This patent discloses molding compositions including a specific epoxy resin which imparts a reduced moisture uptake.

A recent trend in many fields is to blend polymeric materials with particles of a modified clay having a width of several microns and a thickness in the nanometers, designated as "nanosize" particles. Composite materials made from blending clay nanosize particles with such polymeric materials can have improved properties such as reduced moisture uptake. For example, U.S. Pat. Nos. 5,554,670 and 5,853,886 disclose clay nano-composites in epoxy compositions. In polymers made from such epoxy-clay nano-composites, the clay filler represents the main filler component. Clay fillers, however, are known to swell in use, which results in compositions having a high viscosity, thus rendering the epoxy compositions too viscous and, therefore, not useful in highly filled powder molding compositions.

Accordingly, it would be advantageous to provide a molding composition useful as an encapsulant for electronic packaging materials which provides the advantages of highly filled epoxy-based powder compositions with reduced moisture uptake.

SUMMARY OF THE INVENTION

It has been discovered through the present invention that a molding composition having reduced moisture uptake can be accomplished through epoxy-clay nano-composites which are used as an epoxy component and which are mixed with bulk filler materials used in traditional molding compositions. Accordingly, the present invention is directed to molding compositions including a bulk amount of a filler component, and an epoxy-clay nano-composite including a mixture of an epoxy resin, a resin hardener, and clay, and optionally a catalyst for promoting reaction between the epoxy resin and the resin hardener. The bulk amount of the filler component in the molding composition ranges from about 50 weight percent to about 95 weight percent. The molding composition is resistant to moisture uptake. The invention is further directed to an electronic packaging material, which packaging material is a reaction product of such a molding composition, as well as an electronic package including an electronic component encapsulated with such a molding composition.

In a further embodiment, the invention is directed to a molding composition which includes an epoxy-clay nano-composite and a bulk amount of a filler component, wherein the composition has a moisture uptake of less than 0.33 percent after exposure to about 85° C. and about 85% relative humidity for a period of about 168 hours.

In a further embodiment, the present invention is directed to a method of preparing a molding composition including preparing an epoxy-clay nano-composite by melt-blending a mixture of an epoxy resin component, a resin hardener component and clay at a temperature capable of melting the epoxy resin component without causing polymerization of the epoxy resin component, for example, at a temperature of below about 100° C. Such a melt-blend mixture is cooled, and then mixed with a catalyst and, optionally, a mold release agent and a coupling agent. The epoxy-clay nano-composite as prepared is then mixed with a bulk amount of a filler material. The mixture may be ground into a powder.

In yet a further embodiment, the present invention includes a method of reducing moisture uptake in highly filled epoxy molding compositions. Such a method includes mixing an epoxy resin component with a bulk amount of a filler material, wherein the epoxy resin component includes an epoxy-clay nano-composite prepared from a melt-blended mixture of an epoxy resin, a resin hardener, and clay.

DETAILED DESCRIPTION OF THE INVENTION

The present invention is directed to a molding composition, and, in particular, a molding composition for use in electronic packaging materials. Traditional molding compositions for use as electronic packaging materials include an epoxy component and a bulk filler material. The molding composition of the present invention includes an epoxy-clay nano-composite which is used as the epoxy component in the molding composition, in combination with a bulk filler material.

The epoxy-clay nano-composite includes a mixture of an epoxy resin, a resin hardener, and clay, and may further include a catalyst for promoting reaction between the epoxy resin and the resin hardener. For purposes of the present invention, the phrase "epoxy-clay nano-composite" is not meant to encompass a final polymer reaction product as formed through polymerization reaction of the components, but instead represents the melt-blended, dry powder mixture of these components. Such a mixture is an intermediate component in the present invention, which is further processed to form the molding compositions of the present invention, as will be discussed in further detail herein.

The epoxy resin component may be any type of epoxy resin useful in molding compositions, including any material containing two or more reactive oxirane groups. The epoxy resin may have two or more epoxy groups in one molecule, including glycidyl ether type; glycidyl-ester type; alicyclic type; heterocyclic type and halogenated epoxy resins, etc. Non-limiting examples of suitable epoxy resins include epoxy cresol novolac resin, phenolic novolac epoxy resin, biphenyl epoxy resin, hydroquinone epoxy resin, stilbene epoxy resin, and mixtures and combinations thereof. Epoxy cresol novolac resin is particularly desirable for use in the present invention. The epoxy resins may be used either individually or as a mixture of two or more resins, such as a combination of epoxy cresol novolac and biphenyl epoxy resin.

A resin hardener component is provided for promoting crosslinking of the molding composition to form a polymer composition. The resin hardener includes a phenol-derived or substituted phenol-derived novolac or an anhydride. Non-limiting examples of suitable hardeners include phenol novolac hardener, cresol novolac hardener, dicyclopentadiene phenol hardener, limonene type hardener, anhydrides, and mixtures thereof. Phenol novolac hardener is particularly desirable. Also, in a similar manner as with the epoxy resins, the resin hardener may be used either individually or as a mixture of two or more hardeners.

In desirable embodiments including a phenol novolac hardener, the phenol novolac hardener desirably contains a biphenyl or naphthyl moiety. The phenolic hydroxy groups can be attached to the biphenyl or naphthyl moiety of the compound. A preferred phenol novolac hardener is commercially available from Meiwa Plastic Industries, Ltd. of Japan (catalog no. MEH 7851, SS graded). This type of hardener may also be prepared according to the methods described in EP 915 118 A1. For example, a hardener containing a biphenyl moiety can be prepared by reacting phenol with bismethoxy-methylene biphenyl.

The epoxy-clay nano-composite also includes clay in the form of a smectite. Clays are fine-grained materials having a phylosillicate or sheet-like structure. Smectite or smectite-type clays as used in the present invention refers to the general class of clay minerals with expanding crystal lattices. Smectite clays are generally considered swelling clays, which absorb water or other polar ions into their structure, thus forming a sandwich-type structure. Non-limiting examples of clays useful in the present invention include dioctahedral smectites, including montmorillonite; beidellite, and nontronite; and trioctahedral smectites, including saponite, hectorite and sauconite, as well as synthetically prepared smectite clays, such as those prepared through hydrothermal processes, as is known in the art. Examples of particularly desirable clays are those commercially available under the name CLOISITE® from Southern Clay Products, Inc. of Gonzales, Tex.

As noted above, the epoxy-clay nano-composite represents an unreacted intermediate component. While such intermediate component includes epoxy resin, resin hardener and clay as elements thereof, it is also possible to include additional components within this intermediate component. For example, the epoxy-clay nano-composite may further include a catalyst for promoting reaction between the epoxy resin and the resin hardener during curing of the, molding composition. Incorporating a catalyst directly in the epoxy-clay nano-composite provides effective catalytic activity for subsequent reaction, since both the epoxy resin and the hardener are present within the nano-composite structure.

Such catalysts for promoting reaction between the epoxy resin and the hardener are well known in the art. Examples of such catalysts include, but are not limited to, basic and acidic catalysts such as metal halide Lewis acids, including boron trifluoride, stannic chloride, zinc chloride and the like; metal carboxylate-salts such as stannous octoate and the like; and amines, such as triethylamine, imadazole derivatives, and the like.

As will be described in more detail herein, the epoxy resin, the resin hardener, and the clay are mixed to form an epoxy-clay nano-composite. The amount of epoxy resin provided in the epoxy-clay nano-composite may range from about 20 weight percent to about 75 weight percent based on the weight of the epoxy-clay nano-composite, desirably from about 55 weight percent to about 65 weight percent based on the weight of the epoxy-clay. nano-composite. The amount of resin hardener in the epoxy-clay nano-composite may range from about 7.5 weight percent to about 50 weight percent based on the weight of the epoxy-clay nano-composite, desirably from about 25 weight percent to about 35 weight percent based on the weight of the epoxy-clay nano-composite. The clay may be provided in the epoxy-clay nano-composite at a range of about 2.5 weight percent to about 15 weight percent based on the weight of the epoxy-clay nano-composite, more desirably at a range of about 2.5 weight percent to about 5 weight percent based on the weight of the epoxy-clay nano-composite. In embodiments in which a catalyst is included within the epoxy-clay nano-composite, the amount of catalyst provided in the epoxy-clay nano-composite ranges from about 0.5 weight percent to about 50 weight percent based on the weight of the epoxy-clay nano-composite, desirably from about 0.5 weight percent to about 5 weight percent based on the weight of the epoxy-clay nano-composite.

The epoxy-clay nano-composite is further combined with a bulk amount of a filler component to form the molding composition of the present invention. The bulk filler component or filler material may be any material known in the art for use as a filler material. For example, the filler material may be silica, calcium carbonate, calcium silicate, aluminum oxide, glass fibers, and mixtures thereof. In particularly desirable embodiments, the filler material is silica.

As indicated, the filler material is present in the molding composition of the present invention in a bulk amount, therefore representing a substantial portion or majority component of the molding composition. The amount of the filler material in the molding composition ranges from about 50 weight percent to about 95 weight percent based on the total weight of the molding composition, desirably from about 75 weight percent to about 55 weight percent based on the total weight of the molding composition. As such, the epoxy-clay nano-composite represents from about 5 weight percent to about 50 weight percent of the molding composition, desirably from about 25 weight percent to about 45 weight percent of the molding composition. It particularly desirable embodiments, the filler material represents about 80 weight percent of the molding composition, with the epoxy-clay nano-composite representing about 20 weight percent based on the total weight of the molding composition. With the epoxy-clay nano-composite desirably representing about 20 weight percent of the molding composition, the amount of epoxy resin present in the molding composition ranges from about 4 weight percent to about 15 weight percent based on the total weight of the molding composition, desirably about 11 weight percent to about 13 weight percent of the molding composition. The amount of the resin hardener in the molding composition ranges from about 1.5 weight percent to about 10 weight percent based on the total weight of the molding composition, desirably about 5 weight percent to about 7 weight percent of the molding composition. The amount of the clay in the molding composition ranges from about 0.5 weight percent to about 3 weight percent based on the total weight of the molding composition, desirably about 0.5 weight percent to about 1 percent of the molding composition. The amount of the catalyst in the molding composition ranges from about 0.1 weight percent to about 10 weight percent, desirably about 0.1 to about 1 weight percent.

It is believed that the use of the epoxy-clay nano-composite as the epoxy component in the molding compositions provides a synergistic effect with the bulk filler material, thereby reducing the moisture uptake by the composition. For example, the epoxy-clay nano-composite represents a layered sheet-like structure, with individual sheets of clay acting as barrier layers. Such barrier layers further prevent absorption of moisture into the composition. As such, the molding composition has an overall reduction in moisture uptake.

Moreover, the molding composition of the present invention may include additional components and additives known to impart specific properties to the molding composition, depending on the intended application of the product. For example, the molding composition may include a component selected from mold release agents, coupling agents, colorants, flame retardants, ion scavengers, and mixtures thereof.

Mold release agents are chemical agents commonly used to assist in the release of the cured epoxy molding compounds from the curing mold. Examples of useful mold release agents include carnauba wax, montanic acid ester wax, polyethylene wax, polytetrafluoroethylene wax, glyceral monostearate, metallic stearates, paraffin wax, and the like. The mold release agent may be provided in an amount of from about 0.1 weight percent to about 2 weight percent based on the total weight of the molding composition.

Coupling agents are known to improve the dry electrical properties of compounds. Examples of useful coupling agents include silane-type coupling agents, characterized by the formula $R'Si(OR)_3$, where R' represents an organofuntional group such as amino, mercapto, vinyl, epoxy or methacryloxy, and OR represents a hydrolyzable alkoxy group attached to the silicon. The coupling agent may be provided in an amount of from about 0.1 weight percent to about 2 weight percent based on the total weight of the molding composition.

Examples of useful colorants include carbon black, pigments, dyes, and the like. The colorant may be provided in an amount of from about 0.1 weight percent to about 2 weight percent based on the total weight of the molding composition.

Examples of useful flame retardants include bromine-containing flame retardants, phosphorus-containing flame retardants, antimony oxide flame retardants, and the like. The flame retardant may be provided in an amount of from about 1 weight percent to about 5 weight percent based on the total weight of the molding composition. In addition, bromine-free flame retardants, commonly referred to as "green compounds", may also be used.

Examples of useful ion scavengers include magnesium aluminum carbonate hydrate. The ion scavenger may be provided in an amount of from about 0.1 weight percent to about 2 weight percent based on the total weight of the molding composition.

Such additional components may be provided in the molding composition by inclusion in the epoxy-clay nano-composite during formation thereof, or may be provided by inclusion in the molding composition upon mixing of the epoxy-clay nano-composite with the bulk filler material. For example, a portion of the mold release agent and the coupling agent may be included in the epoxy-clay nano-composite during formation thereof, and a further portion of the mold release agent and the coupling agent may be combined with the bulk filler material prior to mixing of the epoxy-clay nano-composite and the bulk filler. Also, the additional components may be provided to the composition during mixing of the epoxy-clay nano-composite with the bulk filler material.

The clay component of the molding composition may further impart flame retardation properties to the composition.

The present invention will now be described in terms of a method of preparing the molding compositions. First, the epoxy-clay nano-composite is prepared. This is accomplished by initially melt-blending a mixture of the epoxy resin component, the resin hardener component, and the clay. Melt-blending of these components is believed to cause exfoliation of the clay, in which individual clay layers are separated in a continuous matrix. The melt-blending is conducted at a temperature which is capable of melting the epoxy resin component, and blending the epoxy resin component with the hardener and the clay, without causing homopolymerization of the epoxy resin component. As such, the temperature of the melt-blend is closely monitored to prevent an increase in temperature to a level which would result in polymerization of the epoxy resin. The epoxy resin component, resin hardener component and clay are therefore mixed in the melt-blending step at a temperature of below about 100° C., desirably at a temperature between about 90° C.–95° C.

After melt-blending the epoxy resin and the hardener with the clay, the melt-blended mixture is cooled. The cooled mixture is then pulverized, for example by grinding the mixture into a fine powder. This pulverized mixture is then further combined with the catalyst, and, optionally, a mold release agent and coupling agent, for example by adding the liquid components to the dry powder and mixing the components. The mixture is ground into a powder to form a homogeneous mixture. This homogeneous mixture is referenced in the present application as the epoxy-clay nano-composite.

The epoxy-clay nano-composite thus prepared is then combined and mixed or dry blended with a bulk amount of a filler material, such as silica. Prior to such mixing, the filler material may be treated by mixing with a coupling agent, such as those described in connection with formation of the epoxy-clay nano-composite, such as silane. Additionally, the filler material may also be combined with a mold release agent such as those described in connection with formation of the epoxy-clay nano-composite, such as a wax.

The treated filler material can be mixed with the epoxy-clay nano-composite, as well as any additional additives, in appropriate proportions as set forth above. Such mixing may be accomplished, for example, with a differential roll mill or with an extruder, to produce a uniform sheet, which is subsequently cooled and ground into a fine powder. The powder may be used as is as a final molding powder composition, or may be densified or compacted in known manner to form preforms of pellets or tablets of desired shape or size.

The thus formed molding composition may be molded into various articles by application of the appropriate temperature and pressure. For example, typical molding conditions may range from about 150° C. to about 200° C., desirably about 175° C. to about 190° C., at pressures of from about 400 to about 1,500 pounds per square inch (psi) (about 28–105 kg/cm$^2$), for a time ranging from about 30 to 120 seconds, desirably 60 to 90 seconds. Such conditions result in proper reaction and curing of the epoxy composition to form the electronic packaging material of the present invention, such as for an encapsulated semiconductor.

The molding compositions may be used to encapsulate semiconductor devices, by any conventional method. Any suitable molding apparatus may be employed, such as a transfer press equipped with a multi-cavity mold.

The molding compositions of the present invention including the epoxy-clay nano-composite as the epoxy component in combination with a bulk filler material are resistant to moisture uptake, particularly When compared with conventional epoxy molding compositions. This reduced moisture uptake is believed to be imparted to the composition through a synergistic effect of the components of the epoxy-clay nano-composite and the bulk filler material. In particular, traditional fillers such as silica are porous materials, which can absorb moisture. Merely adding clay in place of a portion of a traditional filler in a molding composition results in the clay acting as a swelling agent, and absorbing moisture into the molding composition. It has been discovered through the present invention, however, that an epoxy-clay nano-composite as an epoxy component in combination with a bulk amount of a traditional filler component will reduce the moisture uptake of the composition. Thus, a synergism exists between the epoxy-clay nano-composite and the filler material, which imparts the improved properties with respect to a decrease in moisture uptake. The moisture uptake of the molding compositions of the present invention is desirably less than about 0.33 percent, after exposure to a temperature of about 85° C. and about 85% relative humidity of a period of about 168 hours.

As such, a further embodiment of the present invention includes a method of reducing moisture uptake in highly filled epoxy molding compositions including an epoxy resin component and a bulk amount of a filler material. In such a method, the epoxy resin component is provided as an epoxy-clay nano-composite including a melt-blended mixture of an epoxy resin a resin hardener, and clay, as described above.

The present invention will be further exemplified through the following examples, which demonstrate the preparation of molding compositions of the present invention, as well as comparisons of such coatings with prior art compositions. Unless otherwise indicated in the examples and elsewhere in the specification and claims, all parts and percentages are by weight temperatures are in degrees Centigrade and pressures are at or near atmospheric pressure.

EXAMPLES

Example 1

This example represents a comparative example demonstrating a conventional highly filled epoxy molding composition including a conventional epoxy component and a bulk amount of a silica filler.

A basic formulation for a molding composition was prepared including the following components:

TABLE 1

| Component | Weight Percent |
|---|---|
| Epoxy[1] | 12.40 |
| Hardener[2] | 6.62 |
| Catalyst[3] | 0.50 |
| Silica Filler | 79.10 |
| Silane Coupling Agent | 1.10 |
| Wax Mold Release Agent[4] | 0.28 |
| TOTAL | 100 |

[1]cresolic novolac
[2]phenolic novolac
[3]EPI-CURE available from Union Carbide Corp.
[4]carnauba wax 1.1 grams of the silane coupling agent and 0.29 grams of the wax mold release agent were initially added to 79.09 grams of the silica filler in a Mixaco blender and blended for a period of 1 to 2 minutes. 12.4 grams of epoxy resin, 6.62 grams of the hardener, and 0.5 grams of the catalyst are then added to the blended mixture of the silica filler, and milled using a two-roll mill at 210° F. The end product was pelletized using a Karas Corporation pelletizer to form an epoxy molding composition identified as Comparative Composition 1.

The molding composition was transfer molded by on a Lawton compression molding press at 177° C. under 0.5 ton.

Example 2

This example represents a comparative example demonstrating a highly filled epoxy molding composition prepared according to the prior art, including a conventional epoxy component and a bulk filler of silica, with a portion of the bulk filler being substituted with clay.

An epoxy molding composition was prepared as in Example 1, with the exception that the filler material included 78.8 grams of silica filler and 0.9 grams of clay. The composition was blended, mixed, and formed in the same manner as in Example 1, to form an epoxy molding composition identified as Comparative Composition 2.

The molding composition was transfer molded in a similar manner as in Example 1.

Example 3

This example demonstrates a highly filled epoxy molding composition prepared according to the present invention.

A basic formulation for a molding composition was prepared including the following components:

TABLE 2A

| Component | Weight Percent |
|---|---|
| Epoxy[1] | 12.29 |
| Hardener[2] | 6.56 |
| Nano-Clay[5] | 0.90 |
| Catalyst[3] | 0.10 |
| Silica Filler | 78.8 |
| Silane Coupling Agent | 1.08 |
| Wax Mold Release Agent[4] | 0.28 |
| TOTAL | 100 |

[1]cresolic novolac
[2]phenolic novolac
[3]EPI-CURE available from Union Carbide Corp.
[4]carnauba wax
[5]Cloisite ® 10A, Available from Southern Clay Products, Inc.

An epoxy-clay nano-composite mixture was prepared, as Component A as follows: 61.45 grams of the epoxy resin was melted at 175° C. 4.5 grams of the clay (dried at 110° C. overnight) and 32.80 grams of the hardener were added to the melted epoxy resin with vigorous stirring for about 50–60 minutes at 90° C.–95° C. After mixing, the mixture was cooled to ambient and pulverized into a powder using a Karas Pulverizor. This powder was then mixed with 0.35 grams of the silane coupling agent, 0.40 grams of the wax, and 0.50 grams of the amine catalyst, to produce an epoxy-clay nano-composite intermediate having the following components:

TABLE 2B

| Component | Weight Percent of Intermediate |
|---|---|
| Epoxy | 61.45 |
| Hardener | 32.80 |
| Nano-Clay | 4.5 |
| Catalyst | 0.5 |
| Silane Coupling Agent | 0.35 |
| Wax Mold Release Agent | 0.40 |
| TOTAL | 100 |

Separately, Component B was prepared as follows: 1.0 grams of the silane coupling agent and 0.20 grams of the wax mold release agent are added to the silica filler in a Mixaco blender and blended for a period of 1–2 minutes.

Component B was then combined and milled with the epoxy-clay nano-composite mixture of Component A prepared as described above at a ratio of 20% Component A to 80% Component B using a tow roll mill. The end product was pelletized using a Karas Corporation pelletizer to form an epoxy molding composition according to the present invention, identified as Inventive Composition 3.

The molding composition was transfer molded in a similar manner as in Example 1.

Molded specimens of each of Comparative Compositions 1 and 2 and Inventive Composition 3 were prepared and tested for hot-plate gel time using a gel plate set at 177° C.; for spiral flow using ASTMD-3123 test method, in which the molding compound is flowed through a spiral semi-circular cross-section until the flow ceases; and for moisture uptake by gravimetric method after subjecting the molded materials to JEDEC (Joint Electron Deviced Engineering Counsel) level 1 testing, which requires the materials to be exposed to 85° C. and 85% relative humidity for a period of 168 hours. The results are shown in Table 3.

TABLE 3

| COMPOSITION | GEL TIME (sec) | SPIRAL FLOW (inches) | MOISTURE UPTAKE (%) |
|---|---|---|---|
| 1 (Comparative) | 25 | 55 | 0.3878 |
| 2 (Comparative) | 75 | 66 | 0.3511 |
| 3 (Inventive) | 25 | 35 | 0.3095 |

As can be seen from the results of Table 3, a comparison of Comparative Composition 1 and Inventive Composition 3 demonstrates a reduction in the moisture uptake in the composition of the present invention (Composition 3), with a reduction in moisture uptake of from 0.3378% to 0.3095%. Such a reduction in moisture uptake is considered to be significant to the electronic packaging industry. Also, a lower spiral flow is observed in Inventive Composition 3. Spiral flows of 25–40 inches are considered adequate for transfer molding packaging. It is believed that the plate structure of swelling clays, with thin hexagonal sheets expanded by the penetration of the polymer, offers resistance to flow, as compared to spherical silica particles of conventional fillers.

Also, a comparison of Comparative Composition 2 and Inventive Composition 3 demonstrates that merely adding clay to an epoxy molding composition does not result in any significant reduction in the moisture uptake, and results in a higher spiral flow.

The foregoing examples are intended to illustrate, without limitation, the molding compositions and methods of the present invention. The invention being thus described, it will be evident to those skilled in the art that the same may be varied in many ways. Such variations are not to be regarded as a departure from the spirit and scope of the invention and all such modifications are intended to be included within the scope of the claims.

What is claimed is:

1. A molding composition comprising:
   a) a bulk amount of a filler component, and
   b) an epoxy-clay nano-composite comprising a melt-blended mixture of:
      i) an epoxy resin;
      ii) a resin hardener; and
      iii) clay.

2. A molding composition as in claim 1, wherein the amount of said filler component in said molding composition ranges from about 50 weight percent to about 95 weight percent based on the total weight of the molding composition.

3. A molding composition as in claim 1, wherein the amount of said clay in said molding composition ranges from about 0.5 weight percent to about 3 weight percent based on the total weight of the molding composition.

4. A molding composition as in claim 1, wherein the amount of said epoxy resin in said molding composition ranges from about 4 weight percent to about 15 weight percent based on the total weight of the molding composition.

5. A molding composition as in claim 1, wherein the amount of said resin hardener in said molding composition ranges from about 1.5 weight percent to about 10 weight percent based on the total weight of the molding composition.

6. A molding composition as in claim 1, wherein said filler component is selected from the group consisting of silica, calcium carbonate, calcium silicate, aluminum oxide, glass fibers and mixtures thereof.

7. A molding composition as in claim 1, wherein said filler component is silica.

8. A molding composition as in claim 1, wherein said epoxy resin is an epoxy cresol novolac resin.

9. A molding composition as in claim 1, wherein said resin hardener is selected from the group consisting of phenol novolacs, cresol novolacs, anhydrides, and mixtures thereof.

10. A molding composition as in claim1, wherein said epoxy-clay nanocomposite further comprises a catalyst for promoting reaction between the epoxy resin and the hardener.

11. A molding composition as in claim 1, further comprising a component selected from the group consisting of mold release agents, coupling agents, colorants, flame retardants, ion scavengers, and mixtures thereof.

12. A molding composition as in claim 1, which is resistant to moisture uptake.

13. An electronic packaging material comprising a reaction product of a molding composition comprising a bulk amount of a filler component and an epoxy-clay nano-composite comprising a mixture of an epoxy-resin, a resin hardener, and clay.

14. An electronic package comprising an electronic component encapsulated with an encapsulant, said encapsulant comprising the reaction product of a bulk amount of a filler component and an epoxy-clay nano-composite comprising a mixture of an epoxy-resin, a resin hardener, and clay.

15. A molding composition comprising:
  a) about 50 weight percent to about 95 weight percent, based on the total weight of the composition, of a filler component, and
  b) about 5 weight percent to about 50 weight percent, based on the total weight of the composition, of an epoxy-clay nano-composite comprising a melt-blended mixture of:
    i) about 20 weight percent to about 75 weight percent, based on the weight of the epoxy-clay nano-composite, of an epoxy resin,
    ii) about 7.5 weight percent to about 50 weight percent, based on the weight of the epoxy-clay nano-composites of a resin hardener,
    iii) about 2.5 weight percent to about 15 weight percent, based on the weight of the epoxy-clay nano-composite of clay, and
    iv) optionally, about 0.5 weight percent to about 50 weight percent, based on the weight of the epoxy-clay nano-composite, of a catalyst for promoting reaction between the epoxy resin and the resin hardener.

16. A molding composition comprising a melt-blended epoxy-clay nano-composite and a bulk amount of a filler component, wherein the molding composition has a moisture uptake of less than about 0.33 percent after exposure to a temperature of about 85 C at about 85 percent relative humidity for a period of about 168 hours.

17. A method of preparing a molding composition comprising:
  a) preparing an epoxy-clay nano-composite by:
    i) melt-blending a mixture of an epoxy resin component, a resin hardener component and clay at a temperature capable of melting said epoxy resin component without causing polymerization of said epoxy resin component;
    ii) cooling said melt-blended mixture;
    iii) mixing said melt-blended mixture with a catalyst, optionally, a mold release agent and optionally, a coupling agent; and
  b) mixing said epoxy-clay nano-composite with a bulk amount of a filler material.

18. A method as in claim 14, wherein said filler material is treated with a coupling agent prior to said mixing step (b).

19. A method as in claim 14, further comprising a step of grinding to a powder said mixture formed by said mixing step (b).

20. A method of reducing moisture uptake in highly filled epoxy molding compositions comprising mixing an epoxy resin component with a bulk amount of a filler material, wherein said epoxy resin component comprises an epoxy-clay nano-composite prepared from a melt-blended mixture of an epoxy resin, a resin hardener and clay.

* * * * *